United States Patent [19]

Keisala

[11] Patent Number: 5,495,691
[45] Date of Patent: Mar. 5, 1996

[54] LINE TRIGGER DEVICE FOR USE WITH A DOWNRIGGER

[75] Inventor: Teuvo Keisala, Saarenkylä, Finland

[73] Assignee: Outek Oy, Saarenkyla, Finland

[21] Appl. No.: 228,036

[22] Filed: Apr. 15, 1994

[30] Foreign Application Priority Data

Apr. 16, 1993 [FI] Finland .................................. 931724

[51] Int. Cl.⁶ .................................................. A01K 91/08
[52] U.S. Cl. ........................................................ 43/43.12
[58] Field of Search ........................... 43/43.12, 44.92, 43/44.88

[56] References Cited

U.S. PATENT DOCUMENTS

| 4,221,068 | 9/1980 | Roemer, Jr. ............... 43/43.12 |
| 4,395,841 | 8/1983 | Cudnohufsky ............. 43/43.12 |
| 4,417,414 | 11/1983 | Hood et al. .............. 43/43.12 |
| 4,700,505 | 10/1987 | Weber ................... 43/44.88 X |
| 4,945,670 | 8/1990 | Wetherald ............... 43/43.12 |

Primary Examiner—Samuel M. Heinrich
Assistant Examiner—Jeanne M. Elpel
Attorney, Agent, or Firm—Steinberg, Raskin & Davidson

[57] ABSTRACT

A device for linking a trolling line to a wire of a downrigger or a sideplanar so that a triggering force from the direction of the lure attached to one end of the trolling line is freely adjustable without affecting the coupling adjustment between the rod and the device, and between the device and the wire. The device can be released from the cable by a sharp pull from the direction of the rod, and then reeled up to the surface and to the boat.

16 Claims, 1 Drawing Sheet

5,495,691

LINE TRIGGER DEVICE FOR USE WITH A DOWNRIGGER

BACKGROUND OF THE INVENTION

The present invention relates to a device for securing a trolling line on a downrigger so that the triggering force from the troll direction is in a different direction than the force applied by the rod.

Today, trolling is a highly popular form of fishing. In the Finnish market, as well as other national markets, various downrigger and sideplanar designs are available. In most of the current designs, the trolling line is secured to a clamp, in which the clamp force is adjusted with a screw. The clamp is further attached either on the weight of the downrigger or to a wire. With the aid of the weight, the downrigger is permitted to drop down to a desired depth, whereby the troll and the troll line follow therealong. This enables the troll line to be dropped to a desired depth for catching fish swimming at that depth.

A particular problem in current designs of trolling devices is the manner for controlling the clamp force so that the triggering acts only when a fish strikes thereby releasing the line from the trolling device, and so that the line is not released from the clamp by drag forces. Particularly when trolling deep down, i.e., when the water depth is over 20 meters, the drag of the water generates a remarkable force against the part of the line between the rod and the clamp. This drag force is ideally eliminated by tensioning the clamp to the extent that the line and the troll remain at the desired depth. However, if a small fish bites the lure, it often happens that the line is not released and, instead, the trolling is continued as before. A tightly tensioned clamp may also damage the line.

OBJECTS AND SUMMARY OF THE INVENTION

It is an object of the present invention to provide a more efficient line trigger device for use with a downrigger or sideplanar.

It is another object of the present invention to provide a line trigger device which is triggered so that the fishing line threaded through the trigger device is released even when a small fish bites the lure.

In accordance with the device of the present invention, the triggering force from the direction of the lure can be adjusted as desired so that even catching a small fish on the lure will make the line trigger and release from the trolling device. Similarly, if the lure catches the bottom or other obstacles, the line trigger device is sensitive enough to release the fishing line from the trigger device, thus preventing the lure from being caught and the device damaged.

The fixing force in the direction of the rod is relative to the size of the device and the strength of the line. The line will not be triggered from the device in any other way but as a result of a pull from the direction of the lure. This feature enables trolling at various depths as well as varying the trolling depth, even within a wide range, in the course of trolling without having to control the locking mechanism of the fishing line. These features can be utilized when the device is used, e.g., in association with a sideplanar.

The device of the invention is attached onto a wire of a downrigger or sideplanar by the aid of a separate fixing clamp element. The tensioning force of the clamp is adjustable with a set screw. Normally, the tensioning force is considerably greater than the triggering force from direction of the lure. The tensioning force is, however, smaller than the traction force of the fishing line. The device can, therefore, be released by pulling the rod upward abruptly so that the fishing line and trigger device are separated from connection with the wire. In order to prevent the device from being carried away with the fishing line, a second separate fixing wire is provided, with one end thereof being fixedly secured to the device and the other end around the wire of the downrigger or planar by a locking means. When reeling in a fish, the separate fixing wire keeps the device connected to the wire of the downrigger or the planar so as to retrieve the same for re-use.

The line trigger device of the invention, for releaseably securing a fishing line to a wire of a downrigger or a sideplanar, comprises first and second bodyparts operatively coupled to each other to form a first slit therebetween through which the fishing line is passed. Each of the bodyparts has a groove on an outer periphery thereof while the first bodypart comprises a locking finger through which the fishing line passes to the grooves on the bodyparts and to the first slit. Adjusting means are provided for setting the magnitude of a force required to release the fishing line from the first slit. Fixing means are also provided for coupling the bodyparts to the wire, and comprise an adjustable clamp. The bodyparts are connected to the fixing means by a stud having a shaft about which the bodyparts and the fixing means rotate. The bodyparts define a space therebetween in which a fixing shaft is at least partially situated and is vertically movable about the shaft of the stud.

The adjusting means are connected to the bodyparts and regulate the size of the first slit to thereby set the magnitude of the force required to release the fishing line from the first slit. A second slit, through which the fishing line passes, is formed between the locking finger of the first bodypart and the second bodypart. The fishing line winds in the grooves on the first and second bodyparts, passes to the first slit, and is locked in the first slit by the adjusting means. The fishing line cannot be triggered by a pull directed from the rod because the line winds in the grooves which prevent the line from unwinding. The first slit is arranged at a first end of the device, and the locking finger and second slit formed in connection therewith are arranged at a second end of the device opposite from the first end. Upon application of the force required to release the fishing line from the first slit, the fishing line is pulled out of the slit, unwinds from the grooves and is released from the second slit around the locking finger.

In the following, the invention will be described in detail with reference to some exemplifying embodiments of the invention illustrated in the figures in the accompanying drawings. However, the invention is by no means strictly confined to the details of the illustrated embodiments.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
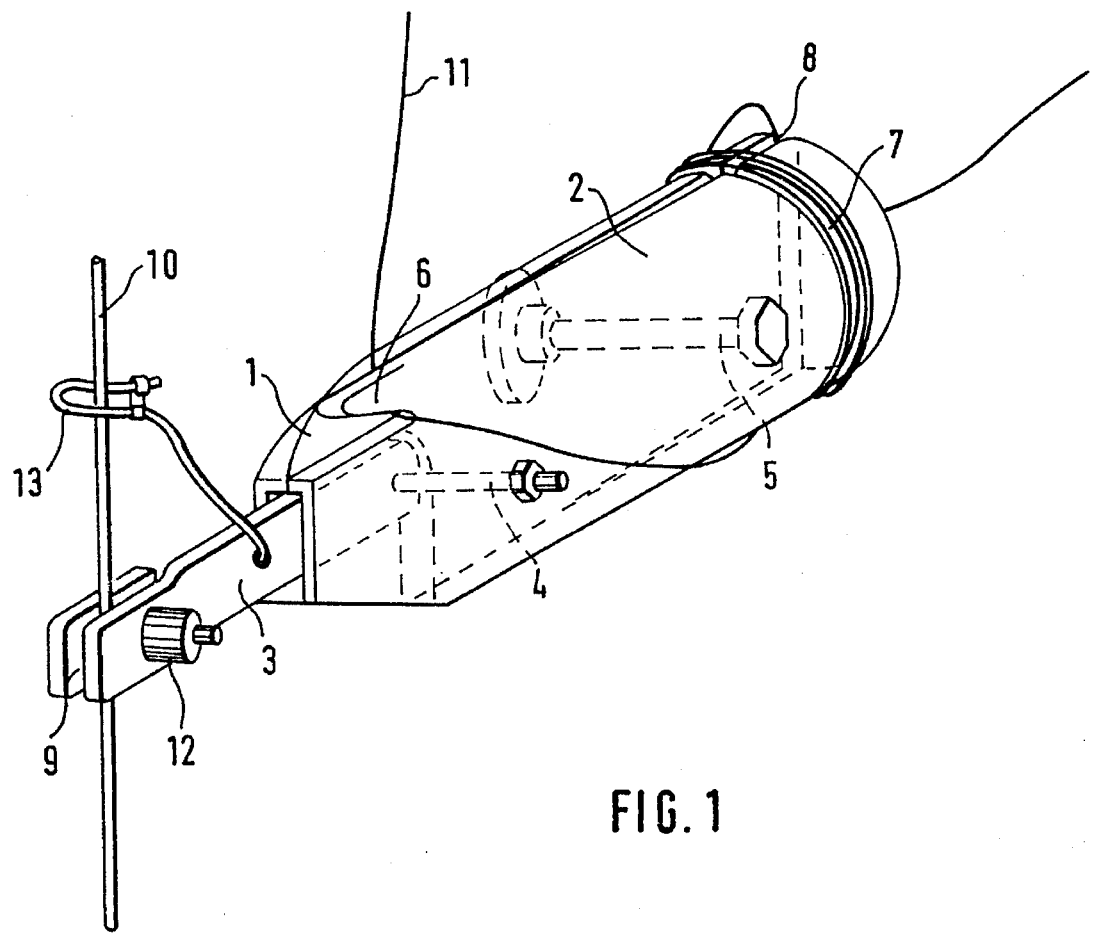
FIG. 1 shows a front perspective view of the device in accordance with the invention.

Referring to the figures, FIG. 1 shows the device of the invention, comprising a bodypart 1 and bodypart 2 made from plastic, wood, metal or equivalent material. The bodyparts are formulated so that a space is formed therebetween. A fixing shaft 3 is arranged for movement in a vertical plane and is situated in a front part of the space formed between the bodyparts 1,2. The path of the fixing shaft can be limited as desired by means of the bodypart formulation. The fixing shaft 3 is secured to the bodyparts (members) 1 and 2 with a fixing stud 4 or other similar securing means. The stud is made from metal, plastic or other appropriate material and secured to the other bodypart. The stud 4 projects out from the surface of the bodypart 2. The device is secured on a wire 10 of the downrigger or the sideplanar by a clamp 9 or other securing means. The clamping of the clamp can be set and adjusted with a set screw 12. The stud 4 is arranged substantially at an end of the device towards the wire 10 to inhibit generation of torque.

The bodyparts 1,2 are attached to each other by means of a set screw 5 as well as the fixing stud 4. The bodypart 2 includes a locking finger 6 arranged so that a fishing line 11 is passed through the locking finger 6, and the rear parts of both of the bodyparts 1 and 2 are provided with a groove 7 for the fishing line. The set screw 5 constitutes adjusting means for setting the triggering force directed at the fishing line which determines what magnitude a force will cause the fishing line to be triggered and released from the trigger device. The adjusting means 5 can be set to be sensitive enough that even a small fish biting the lure will trigger the fishing line 11 to be released from the slit 8. In a preferred embodiment, the adjusting means, e.g., set screw 5, are connected to the bodyparts 1,2 and regulate the size of the slit to thereby regulate the tightness and triggering force of the fishing line. The line groove 7 is preferably provided with a sharp bottom. The set screw 5 should ideally be adjusted so that the bait or lure itself (the drag forces applied to the bait or lure) cannot cause the fishing line to be released from the slit 8 so that an additional force is always needed to release the line from the slit.

When the device is prepared for operation, the fishing line 11 from the fishing rod is threaded into a slit defined by the locking finger 6 between the bodypart 2 and the bodypart 1. The slit is so dimensioned that the fishing line becomes lightly locked in place. The part of the fishing line 11 facing the lure is conveyed to the rear part of the device, and the line is reeled two or three rounds into the line or locking groove 7 in the bodyparts 1,2, whereafter the fishing line is threaded into a slit 8 formed between the bodyparts 1,2. The locking tightness of the line in the slit 8 can be set with the set screw 5. It is important to note that the line 11 cannot be triggered by a pull directed from the rod because the line 11 winds in the locking grooves 7 and prevents the line 11 from unwinding. Moreover, any increase in the resistance of the fishing line 11 from the direction of the rod does not affect the triggering sensitivity of the device.

The locking finger 6 in the bodypart 2 is formed so that when trolling, the pull of the fishing line 11 from the direction of the rod is directed at the stud 4 so that a torque circulating around the device is not generated. In this regard, the stud 4 is preferably positioned at the center of rotation of the device so that the drag forces acting on the device pass through the stud and do not create torque forces.

Figure 2:
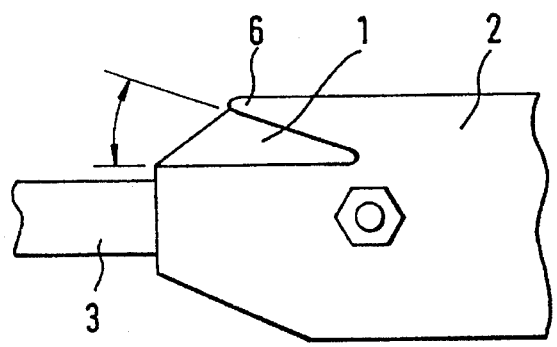
FIG. 2 shows a side view of the device in accordance with the invention shown in FIG. 1.

When a fish strikes the lure or when the lure becomes caught on the bottom, the fishing line 11 is ideally released from the slit 8. However, if the fish does not bite strongly enough, the device is allowed to rotate around the stud 4 as long as a pull from the direction of the lure is directed in a direction perpendicular to the plane including the drag force, e.g., vertically downward. After triggering of the device, the pull of the fishing line from the direction of the lure relative to the fixing and locking finger 6 changes so that a torque is created, turning the bodyparts 1 and 2 around the stud 4 so that the rear end of the bodyparts is depressed (in the event of a downwardly directed force), and the line is released from behind the locking finger 6. It should be noted that the opening angle of the locking finger 6 shown in FIG. 2 must be selected accordingly for proper operation of the device, i.e., the locking finger 6 should open outward and include a sloping surface against which the fishing line can move to be release from the locking engagement between the locking finger 6 and the bodypart 1.

If one wants to pull the device up to the surface in the middle of trolling, it can be released by pulling fishing line 11 by means of the rod abruptly. As a result, the rear end of the device turns upwards and the clamp 9 of the fixing shaft 3 is released from the wire 10, so that the device can be pulled with the line, controlled and guided by a looped wire link 13, up to the surface. In this manner, wire link 13 constitutes a fixing member for connecting the shaft 3 to the wire 10 such that upon release of the wire 10 from the clamp 9, the device is connected via the fixing member (wire link 13) to the wire 10.

It should be noted that the device in accordance with the present invention described above is applied in a downrigger. A device operating according to an equivalent principle may also be used with a sideplanar. Besides, it should be noted that the invention is described above only referring to one potential embodiment.

In use, the adjusting means (set screw 5) regulate the size of the slit 8 formed between the bodyparts 1 and 2, thereby determining the magnitude of the force required to release the fishing line 11 from the slit 8 (i.e., the triggering force). If a force is applied of sufficient magnitude to release the fishing line 11 from the slit 8 the fishing line then unwinds from the grooves 7, and the bodyparts are rotated downward in a direction perpendicular to the direction of the drag forces thereby causing the fishing line to be released from the locking finger 6. The device is still secured to the wire 10 of the downrigger or sideplanar and is thus retrieved.

Still further, even large drag forces will not "trigger", i.e., release the fishing line 11 from the slit 8 since the direction of the drag forces is perpendicular to the axis of rotation of the device, i.e., the stud 4. Moreover, the set screw 5 is adjustable to clamp the fishing line 11 to prevent its release under drag forces.

The example provided above is not meant to be exclusive. Many other variations of the present invention would be obvious to those skilled in the art, and are contemplated to be within the scope of the appended claims.

I claim:

1. A line trigger device for releaseably securing a fishing line to a wire of a downrigger or a sideplanar, comprising first and second bodyparts operatively coupled to each other to form a first slit therebetween through which a fishing line is passed, each of said bodyparts having a groove on an outer periphery thereof, said first bodypart comprising a locking finger through which the fishing line passes to said grooves on said bodyparts and then into said first slit, adjusting means for setting the magnitude of a force required to release the fishing line from said first slit, fixing means for coupling said bodyparts to the wire of the downrigger or sideplanar, said fixing means comprising an adjustable clamp, and a stud for connecting said bodyparts to said fixing means, said stud being a shaft about which said bodyparts and said fixing means rotate.

2. The device of claim 1, wherein said bodyparts define a space therebetween, said fixing means comprising a fixing shaft at least partially situated in said space and being rotatable about said stud.

3. The device of claim 1, wherein said adjusting means are connected to said bodyparts and regulate the size of said first slit to thereby set the magnitude of the force required to release the fishing line from said first slit.

4. The device of claim 1, wherein a second slit is formed between said locking finger of said first bodypart and said second bodypart, the fishing line passing through said second slit, winding in said grooves on said first and second bodyparts, passing to said first slit, and being locked in said first slit by said adjusting means.

5. The device of claim 4, wherein said first slit is arranged at a first end of said device and said locking finger and second slit formed in connection therewith are arranged at a second end of the device opposite from said first end.

6. The device of claim 1, wherein said fixing means further comprising an adjusting member for adjusting the tightness of said clamp for gripping the wire therein.

7. The device of claim 1, further comprising a fixing member for connecting said fixing means to the wire such that upon release of the wire from said clamp, said device is connected via said fixing member to the wire.

8. The device of claim 7, wherein said fixing member comprises a wire link having a loop through which the wire passes.

9. The device of claim 1, wherein said grooves in said bodyparts have a sharp bottom.

10. The device of claim 1, wherein said stud is arranged substantially at an end of the device towards the wire to inhibit generation of torque.

11. The device of claim 1, wherein said adjusting means comprise a set screw extending through said first and second bodyparts.

12. A line trigger device for releaseably securing a fishing line to a wire of a downrigger or a sideplanar, comprising first and second bodyparts operatively coupled to each other to form a first slit therebetween through which a fishing line is passed, each of said bodyparts having a groove on an outer periphery thereof, said first bodypart comprising a locking finger through which the fishing line passes to said grooves on said bodyparts and then into said first slit, adjusting means for setting the magnitude of a force required to release the fishing line from said first slit, fixing means for coupling said bodyparts to the wire of the downrigger or sideplanar, said fixing means comprising an adjustable clamp, and an adjusting member for adjusting the tightness of said clamp for gripping the wire therein.

13. A line trigger device for releaseably securing a fishing line to a wire of a downrigger or a sideplanar, comprising first and second bodyparts operatively coupled to each other to form a first slit therebetween through which a fishing line is passed, each of said bodyparts having a groove on an outer periphery thereof, said first bodypart comprising a locking finger through which the fishing line passes to said grooves on said bodyparts and then into said first slit, adjusting means for setting the magnitude of a force required to release the fishing line from said first slit, fixing means for coupling said bodyparts to the wire of the downrigger or sideplanar, said fixing means comprising an adjustable clamp, and a fixing member for connecting said fixing means to the wire such that upon release of the wire from said clamp, said device is connected via said fixing member to the wire.

14. A line trigger device for releaseably securing a fishing line to a wire of a downrigger or a sideplanar, comprising first and second bodyparts operatively coupled to each other to form a first slit therebetween through which a fishing line is passed, each of said bodyparts having a groove on an outer periphery thereof, said grooves in said bodyparts have a sharp bottom, said first bodypart comprising a locking finger through which the fishing line passes to said grooves on said bodyparts and then into said first slit, adjusting means for setting the magnitude of a force required to release the fishing line from said first slit, and fixing means for coupling said bodyparts to the wire of the downrigger or sideplanar, said fixing means comprising an adjustable clamp.

15. A line trigger device for releaseably securing a fishing line to a wire of a downrigger or a sideplanar, comprising first and second elongate bodyparts operatively coupled to each other to form a first slit therebetween through which a fishing line is passed, each of said bodyparts having a groove on an outer periphery thereof, said first bodypart comprising a locking finger through which the fishing line passes to said grooves on said bodyparts and then into said first slit, a second slit being formed between said locking finger of said first bodypart and said second bodypart, said first slit being arranged at a first end of said device and said locking finger and second slit formed in connection therewith being arranged at a second end of the device opposite from said first end, adjusting means for setting the magnitude of a force required to release the fishing line from said first slit, the fishing line passing through said second slit, winding in said grooves on said first and second bodyparts, passing to said first slit, and being locked in said first slit by said adjusting means, and fixing means for coupling said bodyparts to the wire of the downrigger or sideplanar, said fixing means comprising an adjustable clamp.

16. A line trigger device for releaseably securing a fishing line to a wire of a downrigger or a sideplanar, comprising first and second bodyparts operatively coupled to each other to form a first slit therebetween through which a fishing line is passed, each of said bodyparts having a groove on an outer periphery thereof, said first bodypart comprising a locking finger through which the fishing line passes to said grooves on said bodyparts and then into said first slit, adjusting means for setting the magnitude of a force required to release the fishing line from said first slit, said adjusting means comprising a set screw extending through said first and second bodyparts, and fixing means for coupling said bodyparts to the wire of the downrigger or sideplanar, said fixing means comprising an adjustable clamp.

* * * * *